Aug. 6, 1968     G. L. MOORE     3,395,917
POLE VAULTING STANDARD
Filed Dec. 8, 1964
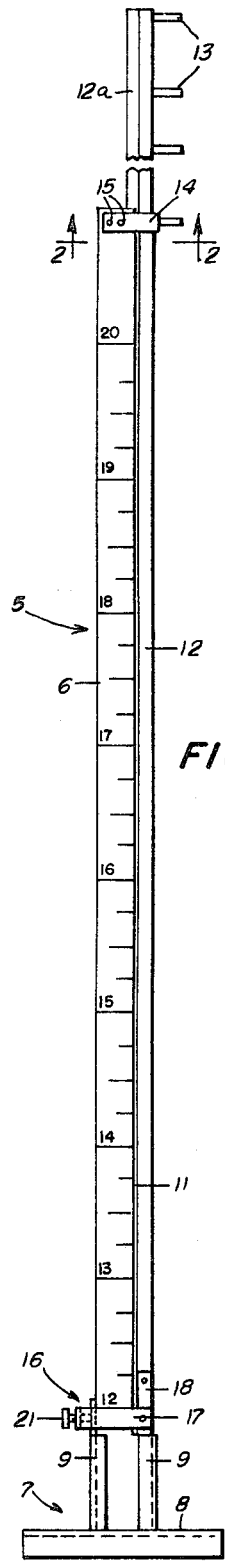
FIG. 1
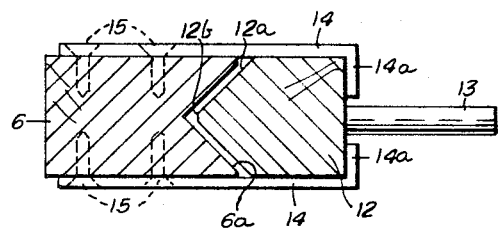
FIG. 2
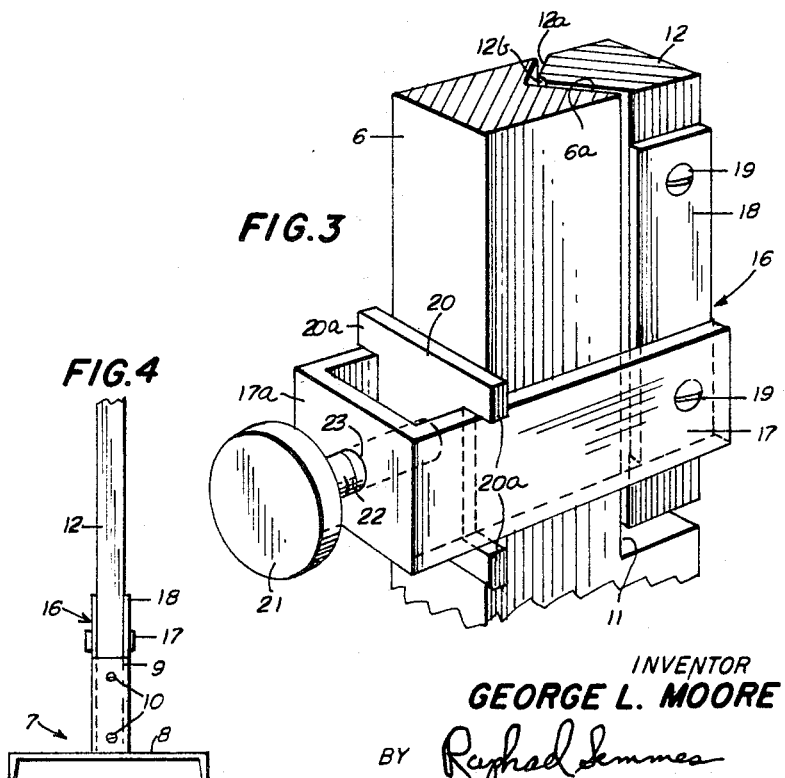
FIG. 3
FIG. 4
INVENTOR
GEORGE L. MOORE
BY Raphael Semmes
ATTORNEY 3,395,917
POLE VAULTING STANDARD
George L. Moore, 2620 Candlewood Way,
La Habra, Calif. 90631
Filed Dec. 8, 1964, Ser. No. 416,845
1 Claim. (Cl. 272—59)

ABSTRACT OF THE DISCLOSURE

A gauge rod standard for athletic jumping events including a stationary upright with a parallel, vertically adjustable upright slidably connected in longitudinal, edgewise engagement with the stationary upright. A gauge rod support is attached to the adjustable upright. The engaging edge surfaces of the uprights have complementary tapered contours throughout their longitudinal extent, and a locking assembly affixed to the adjustable upright slidably embraces the stationary upright. Pressure applied to the locking assembly wedges the opposed tapered surfaces of respective uprights into frictionally locked engagement. The engaging edge surfaces of the stationary and adjustable uprights are provided with V-shaped grooves and wedge-shaped ridges respectively. The apex of the wedge shaped ridge is removed to prevent "bottoming" of the ridge in the groove.

---

This invention relates to adjustable pole vaulting standards and similar devices used in various athletic jumping events. More particularly, the invention consists in new and useful improvements in a pole vaulting standard or the like comprising a stationary vertical upright suitably calibrated to indicate specified heights and an associated vertically adjustable upright slidably mounted on the stationary upright, including means for maintaining a selected, relatively longitudinal adjustment of the two uprights by a novel wedging engagement which is controlled by an externally actuated adjusting and locking assembly.

Two types of standards are conventionally used in pole vaulting events. One is the hole and pin type which usually comprises a telescoping assembly including a tubular, stationary upright having a second tubular upright inserted therein and vertically adjustable. Holes are drilled in the tubes at predetermined intervals and the internal tube is maintained in its vertically adjusted position by means of a pin placed in selected holes.

The other conventional type of standard is frictionally controlled and usually, as in the hole and pin type, a tubular member is employed as the stationary upright and a second vertically movable tubular member is inserted therein. At the bottom of the movable tube, an expandable screw clamp is provided whereby when the screw is turned, the inner movable tube expands radially within the stationary tube so that the frictional pressure prevents relative movement of the two tubes until the pressure is released.

Both of these known types of standards have certain definite disadvantages. For example, with the pin and hole type, which is the most commonly used, the range of adjustment is limited by the fixed spacing of the holes, and in cases where records are involved, it is often desirable to be able to move the cross-bar supported by the standards as little as a quarter inch or less. With both types, the telescopic arrangement of the fixed upright and the adjustable upright is often detrimental because if the standard is dented or bent in any way, it becomes very difficult to raise and lower the adjustable section. This is quite common in the friction or pressure type standard, such as above referred to. Furthermore, it is extremely difficult to repair this type of standard because reasonably close tolerances are required for the mechanism which is not readily accessible from the exterior.

It is the primary object of this invention to overcome these disadvantages and to provide a pole vaulting standard with no telescoping parts and including guide means and an adjusting and locking means which is readily accessible from the exterior.

Another object of the invention is to provide a standard of this type including a stationary main upright and a complementary adjustable upright which are arranged in edgewise slidable engagement throughout their lengths, including locking means designed to coact with the slidably engaging uprights in such a manner as to apply frictional pressure at selected points on their respective engaging edges whereby the adjustable upright is locked at the desired adjustment.

A further object of the invention is to provide a standard comprising two complementary parallel uprights which are relatively slidable longitudinally and wherein the slidably engageable surfaces thereof are respectively contoured to provide a wedging engagement under the influence of a clamp member which is designed to apply lateral pressure to the respective uprights in opposite lateral directions.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views:

FIG. 1 is a front elevational view, partially broken away, illustrating the assembled standard of the present invention;

FIG. 2 is an enlarged transverse sectional view taken on line 2—2 of FIG. 1 showing the guide means;

FIG. 3 is an enlarged fragmentary perspective view illustrating the adjusting and locking device; and FIG. 4 is a fragmentary view showing the base portion of the standard in side elevation, as viewed from the right of FIG. 1.

In the drawings, the assembled standard is represented generally by the numeral 5 and comprises a stationary upright 6, the lower end of which is supported in vertical position by a base member 7. The base may be of any suitable design, that shown in the drawing comprising a base plate 8 having two laterally spaced, vertically extending side plates 9 of substantially U-shape in cross-section and oppositely disposed so as to receive the lower extremity of the upright 6 therebetween. Preferably, screws 10 secure the upright 6 in place between the side plates 9, as seen in FIG. 4.

One longitudinal edge of the stationary upright 6 is recessed as at 11 from its upper extremity to a point adjacent the side plate 9 to receive and accommodate a parallel adjustable upright 12, and, as best seen in FIGS. 1 and 3, the adjacent faces of the respective uprights 6 and 12 are respectively contoured to provide complementary slidably engaging surface. The engaging edge of the stationary upright 6 has a longitudinally extending V-shaped recess 6a extending from end to end, and a corresponding edge of the adjustable upright 12 is substantially wedge-shaped in cross-section, as at 12a, so as to slidably engage the V-shaped recess 6a. Also, in order to facilitate an effective wedging action, as will later appear the apex of the wedge-shaped edge 12a is removed throughout its length as at 12b to avoid "bottoming" in the recess.

The adjustable upright 12 projects vertically beyond the stationary upright and is provided at its upper end with a series of vertically spaced bar retaining pegs 13 which project laterally from the upright 12, as seen in FIG. 1. It will be understood, of course, that two spaced standards 5 are employed when the device is in use so that the corresponding pegs 13 of respective standards can support the opposite ends of the usual horizontal gauge rod used in pole vaulting.

The uprights 6 and 12 are preferably, but not necessarily, formed of suitable wood, and are of the same thickness so that when assembled, the external vertical surfaces of the adjustable upright 12 are contiguous with the adjacent surfaces of upright 6. The upper end of the stationary upright 6 is provided with guide means, preferably in the form of two opposed brackets 14, respectively terminating in inward directed right angular flanges 14a. The brackets 14 are secured to opposite sides of the upright 6 by screws or the like 15, and their angular flanges 14a overlie the outer edge of the adjustable upright 12, as best seen in FIG. 2, so as to slidably engage the latter and retain it in its recess or trackway 6a formed in the stationary upright.

Fixed to the lower end of the adjustable upright 12 and vertically movable therewith is an adjusting and locking assembly, generally indicated by the numeral 16. As best seen in FIG. 3, this assembly comprises a substantially U-shaped yoke 17 which slidably embraces the stationary upright 6 with the free ends of its opposite parallel legs secured to the lower end of the adjustable upright 12. Preferably, opposite side faces of the adjustable upright 12 are provided with mounting plates 18 which respectively underlie the free ends of the legs of the bracket 17, screws 19 being employed to securely attach both the bracket and plates 18 to the upright 12. The base 17a of the U-shaped yoke 17 is laterally spaced from the adjacent vertical edge of the stationary upright 6 to accommodate a pressure receiving plate 20 which is preferably of substantially H-shape and floats horizontally within the space between the yoke base 17a and the adjacent edge of the upright 6. As seen in the drawing, the four legs 20a of the H-shaped plate 20 are respectively spaced to overlie and slidably embrace the edges of the side arms of the U-shaped yoke 17 so that the plate 20 is retained in place for horizontal sliding movement toward and away from the adjacent vertical edge of the upright 6, under the control of an adjusting and locking screw member 21.

The threaded stem 22 of the locking screw engages complementary threads in an opening 23 in the base 17a of the bracket 17, and its inner extremity is engageable with the outer face of the plate 20 when the screw is tightened. Thus, when the proper vertical adjustment of the movable upright 12 is attained, the tightening of the locking screw 21 engages the plate 20, and by means of the yoke 17 draws the lower end of the adjustable upright 12 toward the stationary upright 6. Due to the complementary wedging surfaces 6a and 12a of the two uprights, this screw pressure causes a localized wedging action between the engaging faces of the uprights and locks the adjustable upright in its selected position.

The stationary upright may be calibrated in any manner suitable for the particular athletic event, that shown in the drawing being marked for adjustment from 10 feet to 20 feet, 6 inches. The bottom gauge rod supporting peg 13, when the adjustable upright is in its lowermost position, is set for a minimum height of 10 feet and the remaining pegs are spaced 6 inches apart to a height of 12 feet. Thus, in FIG. 1, the location of the yoke 17 adjacent the height marking "12" indicates that the uppermost peg 13 is set for a height of 12 feet and the lowermost peg 13 for a height of 10 feet. By adjusting the movable upright 12 upwardly, it will be seen that it can be locked in any selected height position within the limits of the calibrations, by simply tightening the locking screw 21 against plate 20 to wedge the complementary edges of the two uprights in locked engagement. It is to be noted that the arrangement of the screw member 21 is such that its enlarged handle serves as a means for manipulating the upright 12, as well as for exerting mechanical pressure for locking the latter in adjusted position.

It will be apparent that the present invention provides an extremely simple and effective pole vaulting standard which is accurate, easy to operate, and positive in its locking action. Furthermore, all of the guiding and locking elements being external, its assembly and the replacement of parts are greatly simplified.

From the foregoing, it is believed that the invention may be readily understood by those skilled in the art without further description, it being borne in mind that numerous changes may be made in the details disclosed without departing from the spirit of the invention as set forth in the following claim.

I claim:
1. A gauge rod standard for athletic jumping events, comprising a stationary upright, a parallel, vertically adjustable upright slidably connected in longitudinal, edgewise engagement with said stationary upright, gauge rod supporting means on said adjustable upright, the engaging edge surfaces of respective uprights having complementary tapered contours throughout their longitudinal extent, a locking assembly fixed to said adjustable upright and slidably embracing said stationary upright, pressure exerting means on said locking assembly for wedging the opposed tapered surfaces of respective uprights into frictionally locked engagement, said engaging edge surface of said stationary upright being provided with a longitudinally extending, substantially V-shaped groove, the corresponding surface of said adjustable upright being provided with a complementary, longitudinally extending wedge-shaped ridge, wherein the longitudinally extending apex of said wedge-shaped ridge is removed to prevent "bottoming" of said ridge in said groove.

References Cited

UNITED STATES PATENTS

| | | | |
|---|---|---|---|
| 1,348,110 | 7/1920 | Hasskarl | 272—70 |
| 2,909,167 | 10/1956 | Fredrickson | 124—24 |

FOREIGN PATENTS 243,633  12/1925  Great Britain.

RICHARD C. PINKHAM, *Primary Examiner.*

T. ZACK, *Assistant Examiner.*